United States Patent [19]

Kremm et al.

[11] Patent Number: 5,943,606
[45] Date of Patent: Aug. 24, 1999

[54] DETERMINATION OF FREQUENCY OFFSETS IN COMMUNICATION SYSTEMS

[75] Inventors: Steven A. Kremm, Boulder; Gordon S. Skinner, deceased, late of Lyons, both of Colo., by Margo Boodakian, legal representative

[73] Assignee: QUALCOMM Incorporated, San Diego, Calif.

[21] Appl. No.: 08/723,724

[22] Filed: Sep. 30, 1996

[51] Int. Cl.⁶ .................................................. H04B 7/185
[52] U.S. Cl. .......................... 455/12.1; 455/63; 455/67.1; 455/71; 455/427; 342/358
[58] Field of Search ........................... 455/10, 12.1, 13.2, 455/504, 63, 67.1, 67.3, 67.5, 69, 70, 71, 75, 517, 524, 427; 342/357, 358

[56] References Cited

U.S. PATENT DOCUMENTS

| 3,864,634 | 2/1975 | Dragonetti . |
| 5,095,538 | 3/1992 | Durboraw, III ............................ 455/71 |
| 5,613,193 | 3/1997 | Ishikawa et al. ....................... 455/12.1 |
| 5,742,908 | 4/1998 | Dent ......................................... 455/63 |

FOREIGN PATENT DOCUMENTS

| 0337269 | 10/1989 | European Pat. Off. . |
| 9608882 | 3/1996 | WIPO . |

Primary Examiner—Doris H. To
Attorney, Agent, or Firm—Russell B. Miller; Gregory D. Ogrod

[57] ABSTRACT

A method and apparatus for determining frequency offsets caused by oscillator error or Doppler effects in a user terminal (for example, a mobile wireless telephone) in a communication system. The system (100) includes at least one user terminal (124, 126) and a base station (112), or gateway (120, 122) for communicating with the user terminal (124, 126) through a satellite (116, 118) with predetermined known orbital positions or patterns. A communication signal (130, 132, 146, 148) is precorrected for known Doppler effects, such as between a gateway and a transferring satellite (146, 148), when used, and transmitted to a user terminal. The user terminal (124, 126) determines the signal frequency relative to a reference oscillator (240), and treats any detected difference as resulting completely from Doppler. The frequency difference is either transferred as data in reverse link transmissions (130, 132, 140, 142), or used as a pre-correction factor for such transmissions. The frequency of the reverse link user terminal signals is measured at the gateway (120, 122), again compensating for known Doppler effects, to provide a nominal error measurement. Measured frequency error or offsets are then divided in half to arrive at a Doppler shift error, or divided in half and scaled to the appropriate frequency to arrive at a user terminal oscillator error. The detected error can be transmitted to the user terminal (124, 126) for use in correcting the oscillator output frequency, or for adjusting the timing of, or time tracking for, the user terminal (124, 126). Alternatively, the detected error can be included as data in subsequent signals for use by gateways (120, 122) or base stations (112).

32 Claims, 6 Drawing Sheets

DETERMINATION OF FREQUENCY OFFSETS IN COMMUNICATION SYSTEMS

CROSS-REFERENCE TO RELATED APPLICATIONS

This application is related to commonly-owned US patent applications, filed concurrently herewith, on Sep. 30, 1996, entitled "Unambiguous Position Determination Using Two Low-Earth Orbit Satellites" having application Ser. No. 08/723,725; "Position Determination Using One Low-Earth Orbit Satellite" having application Ser. No. 08/723,851; "Passive Position Determination Using Two Low-Earth Orbit Satellites" having application Ser. No. 08/723,722; "Instantaneous Ambiguity Resolution For Single Satellite Mobile Position Determination Using Satellite Beams" having application Ser. No. 08/723,723; and "Time And Frequency Precorrection For Non-Geostationary Satellite Communications Systems" having application Ser. No. 08/733,490, which are incorporated herein by reference.

BACKGROUND OF THE INVENTION

I. Field of the Invention

The present invention relates generally to control of frequency and timing, and more particularly to a method for determining and compensating for frequency errors in reference oscillators used in receivers in communication systems. The invention further relates to a technique for determining and compensating for Doppler effects caused by relative motion between transmitters and receivers.

II. Description of the Related Art

Typical advanced terrestrial communication systems, such as wireless data or telephone systems, use base stations, also referred to as cell sites, within predefined geographical regions or cells, to relay communication signals to and from one or more user terminals or system subscribers. Satellite-based communication systems use base stations referred to as gateways, and one or more satellites to relay communication signals between the gateways and one or more user terminals. Base stations and gateways provide communication links from each user terminal to other user terminals or users of other connected communication systems, such as a public telephone switching network. User terminals in such systems can be fixed or mobile, such as a mobile telephone, and positioned near a gateway or remotely located.

Some communication systems employ code division multiple access (CDMA) spread-spectrum signals, as disclosed in U.S. Pat. No. 4,901,307, issued Feb. 13, 1990, entitled "Spread Spectrum Multiple Access Communication System Using Satellite Or Terrestrial Repeaters", and U.S. patent application Ser. No. 08/368,570, filed Jan. 4, 1995, entitled "Method And Apparatus For Using Full Spectrum Transmitted Power In A Spread Spectrum Communication System For Tracking Individual Recipient Phase Time And Energy," which are both assigned to the assignee of the present invention, and are incorporated herein by reference.

In a typical spread-spectrum communication system, one or more preselected pseudonoise (PN) code sequences are used to modulate or "spread" information signals over a predetermined spectral band prior to modulation onto a carrier signal for transmission as communication signals. PN code spreading, a method of spread-spectrum transmission that is well known in the art, produces signals for transmission with a bandwidth much greater than that of the data signal. In a base station- or gateway-to-user terminal communication path or link, PN spreading codes or binary sequences are used to discriminate between signals transmitted by different base stations or over different beams, as well as between multipath signals. This is also referred to as the forward link.

In a typical CDMA spread-spectrum system, channelizing codes are used to differentiate signals intended for various user terminals within a cell or a satellite sub-beam on the forward link. Each user transceiver has its own orthogonal channel provided on the forward link by using a unique "channelizing" orthogonal code. Signals transferred on these channels are generally referred to as "traffic signals." Additional forward link channels or signals are provided for "paging", "synchronization", and other signals transmitted to system users. Walsh functions are generally used to implement the channelizing codes.

Additional details of the operation of this type of transmission apparatus are found in U.S. Pat. No. 5,103,459, entitled "System And Method For Generating Signal Waveforms In A CDMA Cellular Telephone," assigned to the same assignee as the present invention and incorporated herein by reference.

CDMA spread-spectrum communication systems, such as disclosed in the above patents, contemplate the use of coherent modulation and demodulation for forward link user terminal communications. In communication systems using this approach, a "pilot" carrier signal, or simply a "pilot signal," is used as a coherent phase reference for forward link signals. A pilot signal is a signal which generally contains no data modulation, and is transmitted by a gateway, or base station, throughout a region of coverage as a reference.

Pilot signals are used by user terminals to obtain initial system synchronization and time, frequency, and phase tracking of other signals transmitted by base stations or gateways. Phase information obtained from tracking a pilot signal carrier is used as a carrier phase reference for coherent demodulation of other system signals or traffic (data) signals. This technique allows many traffic signals to share a common pilot signal as a phase reference, providing for a less costly and more efficient tracking mechanism. A single pilot signal is typically transmitted by each base station or gateway for each frequency used, referred to as CDMA channels or sub-beams, and shared by all user terminals receiving signals from that source on that frequency.

When user terminals are not receiving or transmitting traffic signals, information can be conveyed to them using one or more signals known as paging signals or channels. For example, when a call has been placed to a particular mobile phone, a base station or gateway alerts that mobile phone by means of a paging signal. Paging signals are used to designate the presence of a call, which traffic channel to use, and to also distribute system overhead information, along with system subscriber specific messages. A communication system may have several paging signals or channels. Synchronization signals can also be used to transfer system information useful to facilitate time synchronization. All of these signals act as shared resources in a manner similar to pilot signals.

User terminals can respond to a message on a paging signal by sending an access signal over the reverse link. That is, the signal path from the user terminal to the base station or gateway. Access signals are also used by user terminals when they originate calls, and are sometimes referred to as access probes. In addition, additional long PN codes, which are not orthogonal, are typically used to create reverse link traffic channels. At the same time, a form of M-ary modulation using a set of orthogonal codes can be used to improve reverse link data transfer.

As with any communication system, forward link communication signals are received by the user terminal and downconverted into a baseband frequency for further processing. Once downconverted, the signals are processed digitally to detect the particular pilot signal or signals being received, and to demodulate associated paging, synchronization, and traffic signals. For spread spectrum systems, the PN spreading codes are applied during demodulation to despread the signals and channelizing codes are correlated with the signals to render data.

In order for the reception, downconversion, and demodulation processing to work correctly in such systems, the user terminal must share a common frequency reference with base stations or gateways transmitting the signals being processed. That is, because information is carried in the phase of the signal carrier, the carrier frequency must be accurately detected, and the position of relative phases of multiple carriers must also be determined. Without reasonably accurate frequency tuning, the carrier cannot be properly removed and the digital signals accurately despread and demodulated.

PN spreading codes and orthogonal channelizing codes cannot be accurately removed without appropriate system timing or signal synchronization. If the codes are applied with incorrect synchronization, the signals will simply appear as noise and no information is conveyed. Determining the positions of satellites, user terminals, and code timing offsets used in such systems, also depends on an accurate knowledge of time or relative temporal displacement. User terminals rely on the accuracy of local oscillators to maintain an appropriate clock rate, event timing, and relative time values with respect to base station or gateway timing, and absolute chronological history or relationships.

To aid this process, local oscillator frequency sources in user terminals can be made to operate with high precision, or can incorporate highly advanced timing circuits or frequency generators. Receivers can be added to detect "universal time" for maintaining chronological accuracy, such as through the use of known GPS system signals. However, such elements are generally undesirable for several reasons. Firstly, their material or manufacturing cost is prohibitive for use in many commercial applications such as for cellular telephones. Secondly, their complexity affects user terminal reliability, especially for typical commercial environments. In addition, power consumption may be increased with more complex or specialized circuits, which negatively impacts power cell life for portable communication devices.

The output frequency of reference sources could also be checked and adjusted or tuned using various forms of feedback control. However, communication systems employing satellites with non-geostationary orbits, exhibit a high degree of relative user terminal and satellite motion. This creates fairly substantial Doppler shifting in the apparent carrier frequency of signals within the communication links. Such Doppler effects must also be accounted for when determining oscillator error, or drift during use, and reduces the usefulness of conventional phase locked loops and other feedback controls. Again, undesirable complexity is needed to implement solutions. The same is also true for non-satellite based communication systems communicating with mobile user terminals or other types of moving repeater platforms that move at high speeds.

Therefore, any system desiring to detect drift or inaccuracies in oscillator output frequencies must also be able to account for Doppler effects on signals being transferred. Unfortunately, while the relative motion between gateways and satellites are well defined, the motion between satellites and user terminals is not. Current communication system designs have been unable to account for the impact of Doppler due to this latter motion, especially in the presence of contemporaneous oscillator errors.

One technique used to help compensate for Doppler or oscillator errors, is to employ what are referred to as deskew buffers which temporarily store a portion of received signals so they can be shifted in time. The size and storage capacity of deskew buffers defines limits on the amount of frequency offset or error for which they can compensate. Buffer sizes are limited by well known cost and circuit design factors. Unfortunately, for large amounts of Doppler shifting, the amount of signal storage needed to compensate exceeds the typical deskew buffer capacity. In addition, if a user terminal oscillator drifts sufficiently, or continues to drift during communication, which is likely for systems using inexpensive oscillators, frequency errors also exceed the deskew buffer capacity and communication link synchronization is lost.

Therefore, what is needed is a method and apparatus for separating and determining both oscillator accuracy or frequency tuning errors for, and Doppler effects experienced by, user terminals within a communication system. This should be accomplished very reliably without undue complexity or cost. It is especially desirable to measure and account for Doppler effects occurring between user terminals and satellites relaying communication signals.

SUMMARY OF THE INVENTION

One purpose of the present invention is to provide a technique for separating receiver oscillator errors and Doppler effects occurring for user terminals within a communication system.

Another purpose of the present invention is to provide a technique for determining a relative magnitude for errors in receiver oscillators in communication systems in which communication signals experience high levels of Doppler shifting.

Yet another, purpose of the invention is to provide a technique for determining a relative magnitude for Doppler shifting of received signal frequency at user terminals in communication systems.

One advantage of the invention is that it can be implemented with a minimum of complexity, and does not even require the user terminal oscillator frequency to be adjusted.

These and other purposes, advantages, and objects are realized in a method and apparatus for rapidly detecting frequency offsets such as those created by errors in oscillators used by user terminals in communication systems, or Doppler shifts. Exemplary communication systems include wireless spread spectrum CDMA communication systems using Low Earth Orbit satellites, and the user terminals typically comprise wireless telephones. However, as would be apparent to one skilled in the relevant art, the present invention can also be applied to a variety of satellite systems and waveforms, or to non-satellite repeater systems.

According to a preferred embodiment of the present invention, a signal is transmitted at a predetermined carrier frequency from a gateway or base station to a user terminal using analog signal transmitters. This signal is typically a pilot or a paging signal, although other types or signal designations can also be used. Preferably, the signal is pre-corrected for a first Doppler factor for known Doppler frequency shifting occurring between a base station or a gateway and a satellite used to transfer the signal. Such Doppler is generally not compensated for when no satellite is used for signal transfer. This process makes use of a pre-correction element coupled to the base station or gateway analog transmitter, preferably in the baseband input path.

A user terminal receiver measures the amount of frequency offset relative to an expected nominal transmission carrier frequency for signals arriving at the user terminal. This offset is determined relative to a user terminal oscillator, scaled for the appropriate frequency band. This measured offset is treated as resulting solely from a second Doppler factor or Doppler shift occurring between the satellite and the user terminal, and establishes a desired frequency pre-correction factor that can be used in generating appropriate return or reverse link communication signals. Where a satellite is not used to receive signals from the communication system, the measured offset is treated the same as the second Doppler factor, but arising between a base station and user terminal.

The user terminal uses a transmitter to generate reverse link communication signals for transmission to the gateway, or base station, through the same satellite, where used. Reverse link signals are typically, but not required to be, generated nominally at another carrier frequency, but incorporate any oscillator error, scaled to the transmission frequency band due to up-conversion. This signal can either have its frequency pre-corrected using the desired pre-correction factor, or the pre-correction factor can be appended or imbedded within the signal for transmission as frequency offset information. When this reverse link signal is received at the gateway, the first Doppler factor, where there is one, is removed from frequency measurements, such as by adjusting a receiver reference frequency, or using a rotator. If the user terminal has not applied frequency pre-correction for the second Doppler factor (plus error), the gateway uses information provided by the user terminal to do so.

A measurement is made of the frequency offset or difference between the frequency of the first Doppler factor corrected user terminal reverse link signal, and the reverse link frequency expected by the gateway, for that user terminal link. This offset provides a nominal error measurement, which can be acted upon by a base station or gateway, such as by using one or more control processors, to divide the value in half and scale it to the user terminal oscillator frequency, because it represents twice the oscillator error for the user terminal, with Doppler for the reverse link communication path having been removed.

The error detected by the present invention, can then be transmitted to the user terminal for further use in adjusting or compensating for the output frequency of the oscillator, or used by base stations and gateways to compensate for frequency errors in received signals. That is, the user terminal can adjust or compensate for frequency error of the oscillator to approach the accuracy of a gateway oscillator, thus, reducing the frequency error in the terminal. Such an adjustment can take place at periodic intervals or as desired for the accuracy of the particular communication system.

The oscillator error data can also be used to adjust user terminal timing, time tracking, or relative time, in addition to frequency. That is, the local time at a user terminal is adjusted to account for errors caused by oscillator frequency errors or inaccuracy, so that time dependent parameters are more accurately determined. In addition, timing and internal clock signals can be adjusted so that the timing of PN and orthogonal codes are adjusted by advancing or retarding the application of such codes by a predetermined number of chips to account for timing errors imparted by oscillator errors.

In some communication systems or terminals it may not be convenient or cost effective for a user terminal to make fine transmission frequency adjustments as necessary for precise frequency correction. Alternatively, the user terminal does not adjust the oscillator frequency, but stores the error value in a memory element or other known storage device. The error value is then retrieved on some predetermined basis, and appended to, or imbedded in, communication signals to inform receiving gateways of the approximate amount of oscillator error at a given time. The error value can be sent as part of access request or probe messages or traffic signals. The error can also be transmitted as the only data in a particular signal to a gateway, as desired.

The transfer of error data without actually correcting the oscillator reference frequency is referred to as "virtual pre-correction" by the inventors. That is, the received signals can be processed by base stations or gateways as if pre-corrected as long as they have this data.

In an alternative embodiment, frequency offsets measured at the user terminal are treated as resulting solely from oscillator error in the user terminal, and this is used to establish the desired frequency pre-correction value for reverse link communication signals. In this configuration the frequency of reverse link signals measured at a base station or gateway, with known gateway-satellite Doppler removed, provides a nominal estimate of satellite-to-user terminal or base station-to-user terminal Doppler. This value can be divided in half, because it represents twice the Doppler shift at the user terminal, with oscillator error for the user terminal having been removed. As before, this Doppler estimate can be transferred to the user terminal for improved frequency pre-correction or for use in virtual pre-correction.

The result is a fast mechanism for separating oscillator error from Doppler effects in a user terminal, so that either can be determined without requiring unduly complex or expensive circuits. This can be accomplished without requiring the user terminal to either correct for such errors or Doppler effects.

BRIEF DESCRIPTION OF THE DRAWINGS

The features, objects, and advantages of the present invention will become more apparent from the detailed description set forth below when taken in conjunction with the drawings in which like reference characters identify correspondingly throughout, the left-most digit(s) of a reference number identifies the drawing in which the reference number first appears, and wherein.

DETAILED DESCRIPTION OF THE PREFERRED EMBODIMENTS

Figure 1:
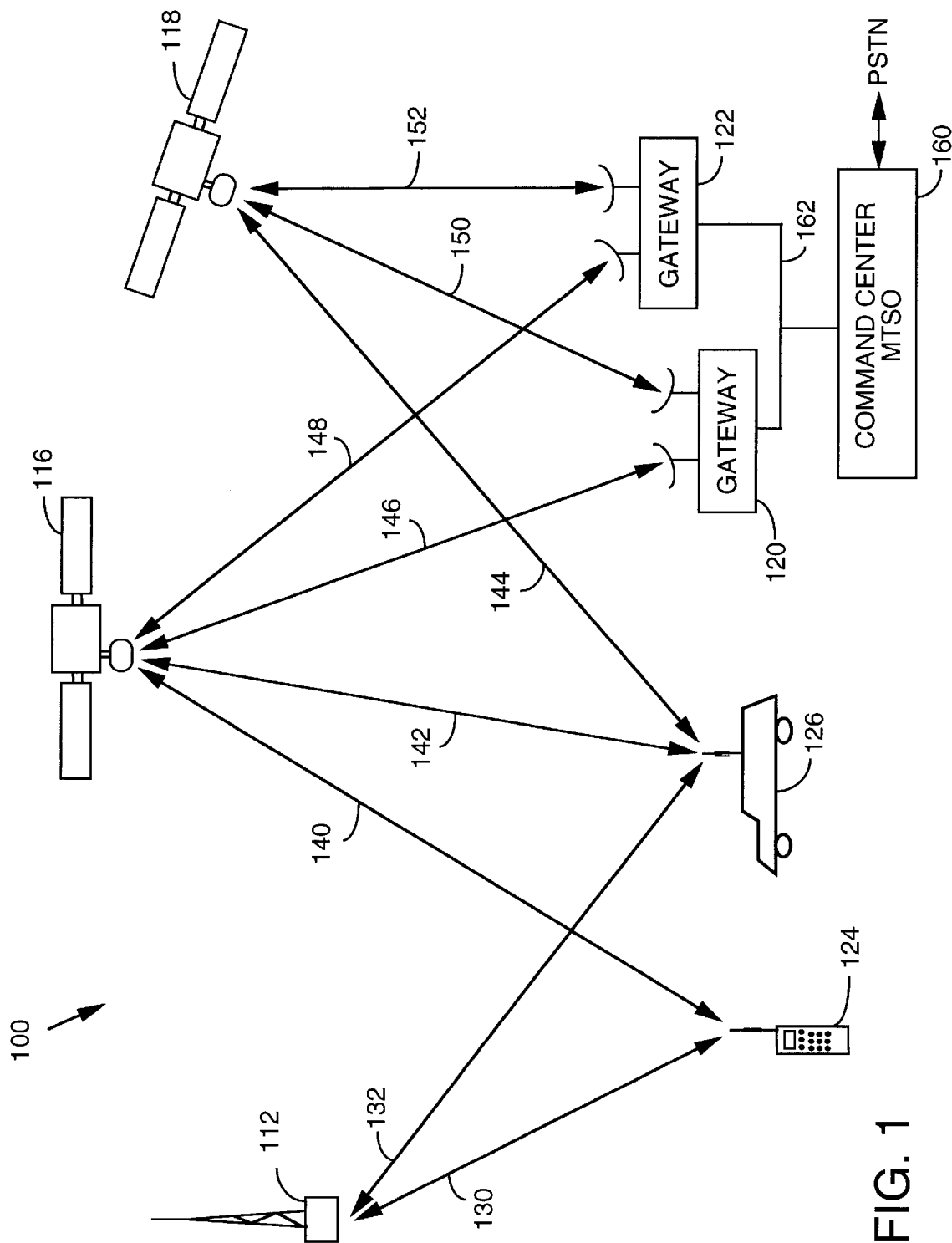
FIG. 1 illustrates a typical communication system in which the present invention is used.

The present invention is a method and apparatus for measuring oscillator error or changes in oscillator frequency in a user terminal, in the presence of Doppler, or for measuring Doppler in the presence of oscillator errors. The present invention effectively separates oscillator errors from certain forward link Doppler shifts so that they can be detected and compensated for. The invention accomplishes this by measuring offsets between the frequency of forward link signals received by the user terminal, precorrected for gateway-satellite Doppler where appropriate, and a local reference, or expected, frequency. Measured offsets are treated as resulting solely from Doppler between a base station or a satellite and the user terminal, and are used to establish a desired frequency precorrection value or factor for reverse link communication signals. A frequency offset is measured for such reverse link signals arriving at a base station or gateway from the user terminal, relative to an expected frequency, with known gateway-satellite Doppler being removed where appropriate, to provide a nominal error measurement. This measurement is divided in half and scaled to the user terminal oscillator frequency, because it represents twice the oscillator error for the user terminal, with the Doppler for all portions of the reverse link communication path having been removed.

Alternatively, offsets measured at the user terminal are treated as resulting solely from user terminal oscillator error, and used to establish a desired frequency precorrection value. In this situation, the frequency offset of reverse link signals arriving at base stations or gateways is measured, with known gateway-satellite Doppler removed, to provide a nominal forward link or satellite-to-user terminal Doppler estimate. This value is then divided in half and used as the user terminal Doppler estimate.

The present invention is particularly suited for use in communication systems employing Low Earth Orbit satellites. However, as would be apparent to one skilled in the relevant art, the concept of the present invention can also be applied to satellite systems that are not utilized for communications purposes. The invention is also applicable to satellite systems in which the satellites travel in non-LEO orbits, or to non-satellite repeater systems, if there is sufficient relative motion between gateways or base stations and user terminals to impact the carrier frequencies being received.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination, and satellite and terrestrial cellular telephone systems. A preferred application is in CDMA wireless spread spectrum communication systems for mobile or portable telephone service, typically using satellite repeaters.

An exemplary wireless communication system in which the present invention is useful, is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways or hubs 120 and 122 are shown for effecting communications with two remote user terminals 124 and 126. Typically, the base stations and satellites/gateways are components of separate communication systems, referred to as being terrestrial and satellite based, although, this is not necessary. The total number of base stations, gateways, and satellites in such systems depend on desired system capacity and other factors well understood in the art.

User terminals 124 and 126 each have or comprise a wireless communication device such as, but not limited to, a cellular telephone, a data transceiver, or a paging or position determination receiver, and can be hand-held or vehicle mounted as desired. Here, the user terminals are illustrated as handheld telephones. However, it is also understood that the teachings of the invention are applicable to fixed units where remote wireless service is desired, including 'inside' as well as 'open air' locations.

Generally, beams from satellites 116 and 118 cover different geographical areas in predefined patterns. Beams at different frequencies, also referred to as CDMA channels or "sub-beams", can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

A variety of multi-satellite communication systems have been proposed with an exemplary system employing on the order of 48 or more satellites, traveling in eight different orbital planes in Low Earth Orbit (LEO) for servicing a large number of user terminals. However, those skilled in the art will readily understand how the teachings of the present invention are applicable to a variety of satellite system and gateway configurations, including other orbital distances and constellations. At the same time, the invention is equally applicable to terrestrial based systems of various base station configurations.

In FIG. 1, some possible signal paths are illustrated for communications being established between user terminals 124 and 126 and base station 112, or through satellites 116 and 118, with gateways 120 and 122. The base station-user terminal communication links are illustrated by lines 130 and 132. The satellite-user terminal communication links between satellites 116 and 118, and user terminals 124 and 126 are illustrated by lines 140, 142, and 144. The gateway-satellite communication links, between gateways 120 and 122 and satellites 116 and 118, are illustrated by lines 146, 148, 150, and 152. Gateways 120 and 122, and base station 112, may be used as part of one or two-way communication systems or simply to transfer messages or date to user terminals 124 and 126.

Communication system 100 generally includes one or more system wide controllers or switching networks 160. Exemplary elements used in such controllers are mobile telephone switching offices (MTSO), which include interface and processing circuitry for controlling routing of telephone calls between a public switched telephone network (PSTN) and gateways. Other exemplary equipment includes ground operations control and command centers which provide system-wide control over timing, PN and orthogonal code and frequency assignments, system access, and so forth, for gateways and satellites. A communication link 162 coupling controllers 160 to various gateways or base stations can be established using known techniques such as, but not limited to, dedicated telephone lines, optical fiber links, or microwave or dedicated satellite communication links.

Figure 2:
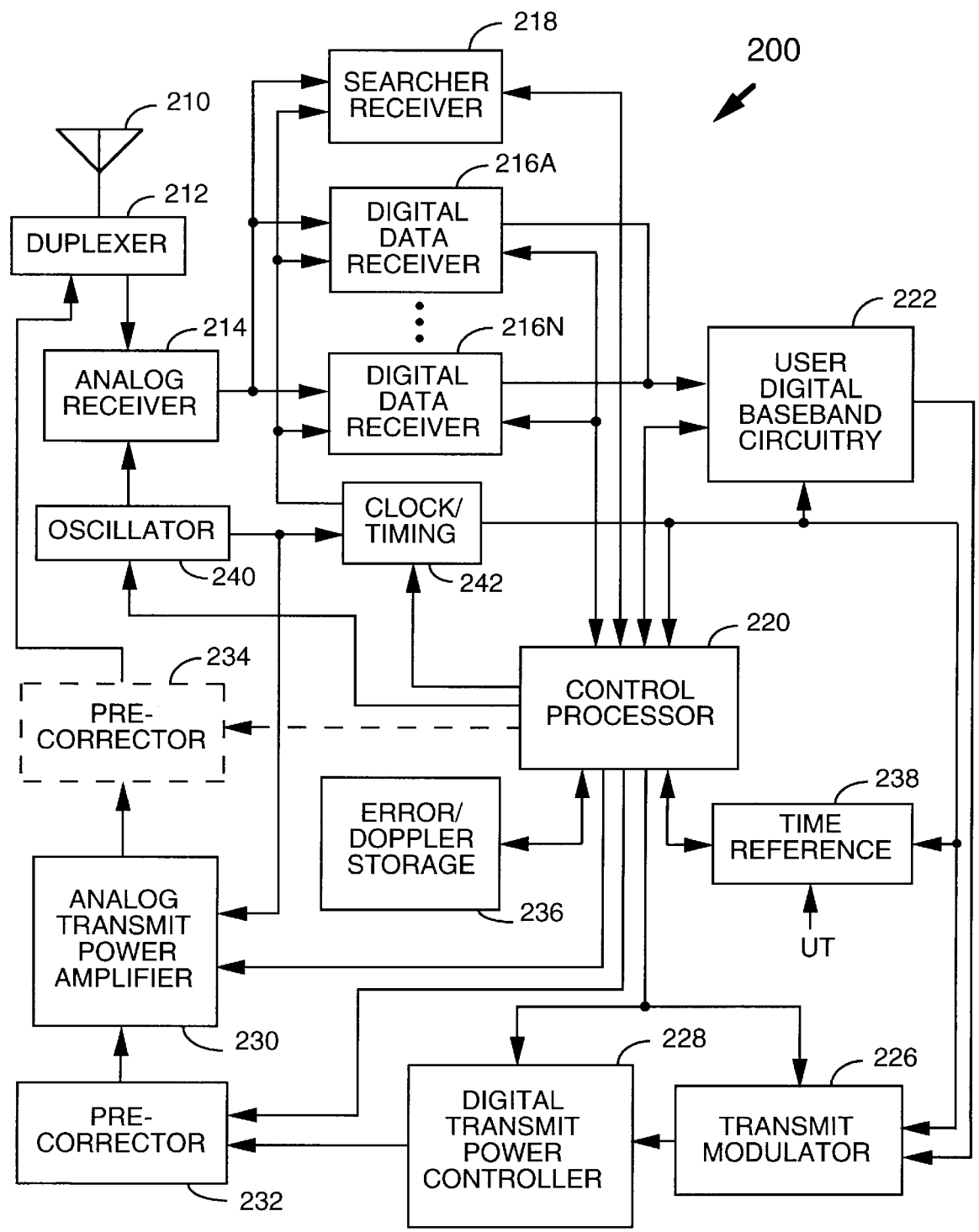
FIG. 2 illustrates exemplary transceiver apparatus for use in a user terminal.

An exemplary transceiver 200 for use in a user terminal 106 is illustrated in FIG. 2. Transceiver 200 uses at least one antenna 210 for receiving communication signals which are transferred to an analog receiver 214, where they are downconverted, amplified, and digitized. A duplexer element 212 is typically used to allow the same antenna to serve both transmit and receive functions. However, some systems employ separate antennas for operating at different transmit and receive frequencies.

Digital communication signals output by analog receiver 214 are transferred to at least one digital data receiver 216A and at least one digital searcher receiver 218. Additional digital data receivers 216B–216N can be used to obtain desired levels of signal diversity, depending on the acceptable level of unit complexity, as would be apparent to one skilled in the relevant art.

At least one user terminal control processor 220 is coupled to data receivers 216A–216N and searcher receiver 218. Control processor 220 provides, among other functions, basic signal processing, timing, power and handoff control or coordination, and selection of frequency used for signal carriers. Another basic control function often performed by control processor 220 is the selection or manipulation of PN code sequences or orthogonal functions to be used for processing communication signal waveforms. Control processor 220 signal processing can include a determination of relative signal strength and computation of various related signal parameters. Such computations of signal parameters, such as relative timing and frequency, may include the use of additional or separate dedicated circuitry to provide increased efficiency or speed in measurements or improved allocation of control processing resources.

Outputs for digital data receivers 216A–216N are coupled to digital baseband circuitry 222 within the user terminal. User digital baseband circuitry 222 comprises processing and presentation elements used to transfer information to and from a user terminal user. That is, signal or data storage elements, such as transient or long term digital memory; input and output devices such as display screens, speakers, keypad terminals, and handsets; A/D elements, vocoders and other voice and analog signal processing elements; etc., all form parts of the subscriber baseband circuitry using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communication signal originating with the user terminal, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a power controller 228 which provides output power control to a transmit power amplifier 230 for final transmission of the output signal from antenna 210 to a gateway.

As discussed further below, in order to implement embodiments of the present invention, user terminal 200 can also employ one or more pre-correction elements or pre-correctors 232 and 234. Preferably, a pre-correction element 232 is used to adjust the frequency of the digital output of digital power controller 228 at baseband frequency. The baseband spectral information including the frequency adjustment is translated to the appropriate center frequency during the up-conversion performed in transmit power amplifier 230. The precorrection or frequency adjustment is accomplished using techniques known in the art. For example, the precorrection can be effected by a complex signal rotation, which is equivalent to multiplying the signal by a factor of $e^{j\omega t}$, where $\omega$ is computed on the basis of known satellite ephemrides and desired channel frequency. This is very useful where communication signals are processed as in-phase (I) and quadrature phase channels (Q). A direct digital synthesis device can be used to generate some of the rotation products. Alternatively, a coordinate rotation digital computation element can be used that employs binary shifts, adds, and subtracts to perform a series of discrete rotations, resulting in the desired overall rotation. Such techniques, and related hardware are well understood in the art.

As an alternative, precorrection element 234 can be disposed in the transmission path on the output of transmit power amplifier 230, to adjust the frequency of the outgoing signal. This can be accomplished using well known techniques, such as, up- or down-conversion of the transmission waveform. However, changing the frequency on the output of the analog transmitter can be more difficult in that there are often a series of filters used to shape the waveform, and changes at this juncture may interfere with the filtering process. In the alternative, precorrection element 234 can form part of a frequency selection or control mechanism for the analog up-conversion and modulation stage (230) of the user terminal so that an appropriately adjusted frequency is used to convert the digital signal to a desired transmission frequency in one step.

Information or data corresponding to one or more measured signal parameters for received communication signals, or one or more shared resource signals, can be sent to the gateway using a variety of techniques known in the art. For example, the information can be transferred as a separate information signal or be appended to other messages prepared by user digital baseband circuitry 222. Alternatively, the information can be inserted as predetermined control bits by transmit modulator 226 or transmit power controller 228 under control of control processor 220.

Data receivers 216A–N and searcher receiver 218 are configured with signal correlation elements to demodulate and track specific signals. Searcher receiver 218 is used to search for pilot signals, or other relatively fixed pattern strong signals, while digital receivers 216A–N are used to demodulate other signals associated with detected pilot signals. Therefore, the outputs of these units can be monitored to determine the energy in or frequency of the pilot signal or other signals. These receivers employ frequency tracking elements that can be monitored to provide current frequency and timing information, to control processor 220 for signals being demodulated.

Control processor 220 uses such information to determine to what extent the received signals are offset from an expected reception frequency or the oscillator frequency, when scaled to the same frequency band, as appropriate. This and other information related to frequency errors and Doppler shifts, as discussed below, can be stored in one or more error/Doppler storage or memory elements 236, as desired. This information can be used by control processor 220 to adjust the oscillator operating frequency, or can be transferred to gateways or base stations using various communication signals.

At least one time reference element 238 is used to generate and store chronological information such as the date and time of day. One use of this information is to assist in determining satellite positions within known orbits. The time can be stored and updated periodically, and a Universal Time (UT) signal from a GPS receiver can be used as part of this process in some applications. The time may also be supplied to the user terminal periodically by a gateway. In addition, the current time is stored each time a user terminal enters an inactive mode such as when it is "turned off". This time value is used in conjunction with the "turn on" time to determine various time dependent signal parameters and user terminal position changes. Generally, the local oscillator acts as a reference for a clock circuit used to generate or track time in time reference element 238, and errors can cause the "time" to drift or become inaccurate.

As shown in FIG. 2, a local or reference oscillator 240 is used as a reference for analog receiver 214 to down convert the incoming signal to baseband at the desired frequency. It can also be employed in multiple intermediate conversion steps, as desired, until the signal is at the desired baseband frequency. As shown, oscillator 240 is also used as a reference for analog transmitter 230, for up-conversion from baseband to the desired carrier frequency for reverse link transmissions. Therefore, local oscillator errors impact both input and output signal processing.

Oscillator 240 is also used as a frequency standard or reference for a timing circuit 242. Timing circuit 242 generates timing signals for other stages or processing elements within user terminal 200 such as, time tracking circuits, or the correlators in digital receivers 216A–N and 218, or transmit modulator 226, time reference element 238, and control processor 220. The frequency of the oscillator output may be adjusted, using known circuitry, to form the desired timing signals, as well known in the art. Such timing signals are typically referred to as clock signals for many circuits. Timing circuit 242 can also be configured to produce delays or retarding, or advancing in the relative timing of clock signals, under processor control. That is, time tracking can be adjusted by predetermined amounts. This also allows the application of codes to be advanced or retarded from "normal" timing, typically by one or more chip periods, so that PN codes or chips making up the codes can be applied with different timing, as desired.

From this it is clear why the output of oscillator 240 plays such a key role in the reception and demodulation of communication signals, as a well as in the generation of outgoing communication signals. Errors in the frequency output by oscillator 240, or drifting of this frequency during use, affects the frequency values used and timing for virtually all input and output stages of user terminal 200.

Figure 3:
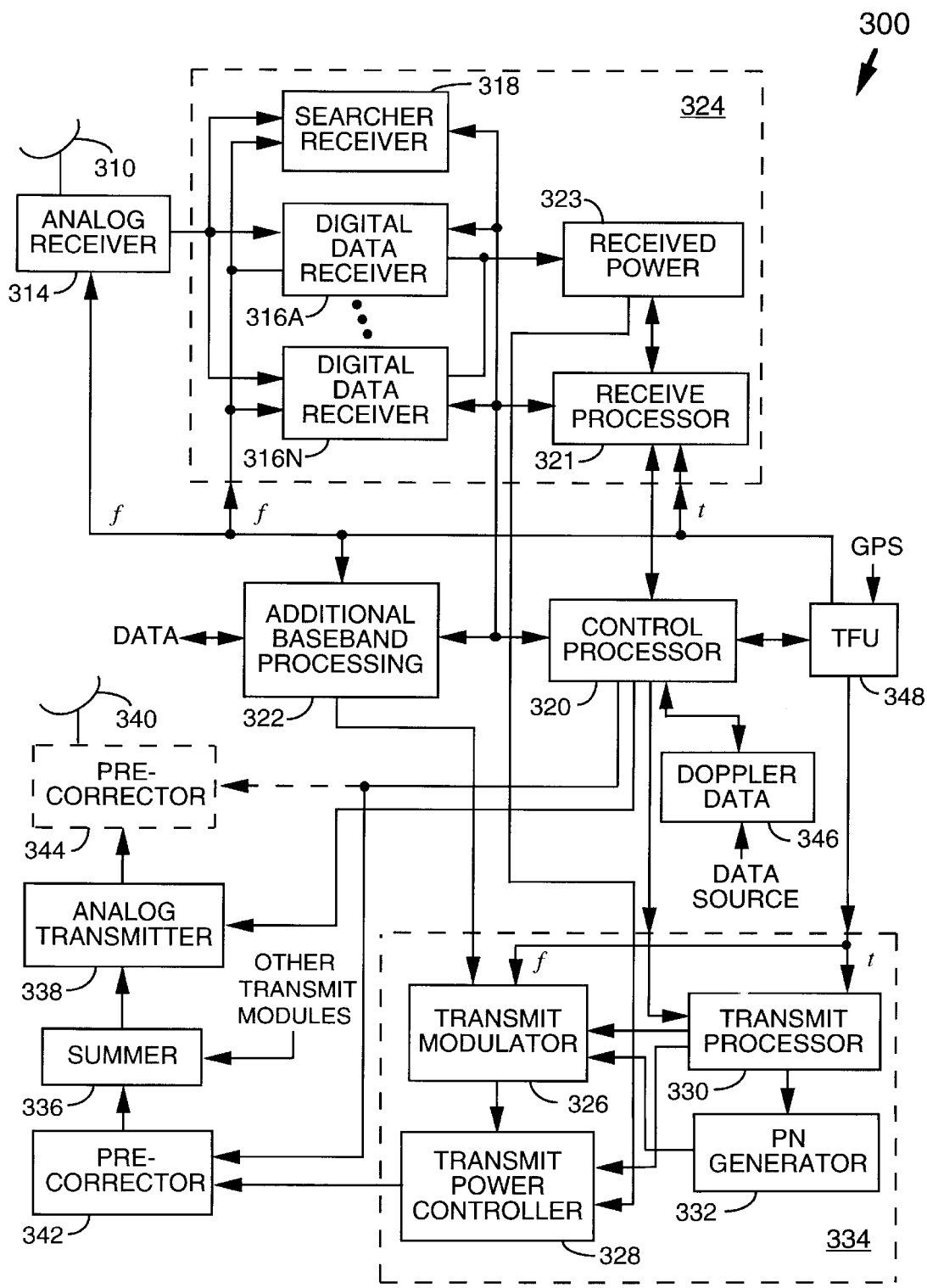
FIG. 3 illustrates exemplary transmission and reception apparatus for use in a gateway or base station.

An exemplary transmission and reception apparatus 300 for use in gateways 120 and 122, or a base station, is illustrated in FIG. 3. The portion of gateway 120, 122 illustrated in FIG. 3 has one or more analog receivers 314 connected to an antenna 310 for receiving communication signals which are then downconverted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communications between a gateway 120,122 and one user terminal 124, 126, although certain variations are known in the art. One analog receiver 314 can provide inputs for many digital receiver modules 324, and a number of such modules are typically used in gateways 102 to accommodate all of the satellite beams and possible diversity mode signals being handled at any given time. Each digital receiver module 324 has one or more digital data receivers 316 and searcher receivers 318. Searcher receivers 318 generally search for appropriate diversity modes of signals other than pilot signals. Where implemented in the communication system, multiple digital data receivers 316A-316N are used for diversity signal reception.

The outputs of data receivers 316 are provided to subsequent baseband processing elements 322 comprising apparatus well known in the art and not illustrated in further detail here. Exemplary baseband apparatus includes diversity combiners and decoders to combine multipath signals into one output for each user. Exemplary baseband apparatus also includes interface circuits for providing output data, typically to a digital switch or network. A variety of other known elements such as, but not limited to, vocoders, data modems, and digital data switching and storage components may form a part of baseband processing elements 322. These elements operate to also control or direct the transfer of data signals to one or more transmit modules 334.

Signals to be transmitted to user terminals are each coupled to one or more appropriate transmit modules 334. A typical gateway uses a number of such transmit modules 334 to provide service to many user terminals 124, 126 at a time, and for several satellites and beams at a time. The number of transmission modules 334 used by gateways 120,122 is determined by factors well known in the art, including system complexity, number of satellites in view, user capacity, degree of diversity chosen, and the like.

Each transmit module 334 includes a transmit modulator 326 which spread-spectrum modulates data for transmission and has an output coupled to a digital transmit power controller 328, which controls the transmission power used for the outgoing digital signal. Digital transmit power controller 328 applies a minimum level of power for purposes of interference reduction and resource allocation, but applies appropriate levels of power when needed to compensate for attenuation in the transmission path and other path transfer characteristics. At least one PN generator 332 is used by transmit modulator 326 in spreading the signals. This code generation can also form a functional part of one or more control processors or storage elements used in gateways 122, 124, or base station 112, and may be time shared.

The output of transmit power controller 328 is transferred to a summer 336 where it is summed with the outputs from other transmit power control circuits. Those outputs are signals for transmission to other user terminals 124, 126 at the same frequency and within the same beam as the output of transmit power controller 328. The output of summer 336 is provided to an analog transmitter 338 for digital-to-analog conversion, conversion to the appropriate RF carrier frequency, further amplification, filtering, and output to one or more antennas 340 for radiating to user terminals 124, 126. Antennas 310 and 340 may be the same antennas depending on the complexity and configuration of the communication system.

At least one gateway control processor 320 is coupled to receiver modules 324, transmit modules 334, and baseband circuitry 322; these units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, orthogonal code sequences, and specific transmitters and receivers or modules for use in user communications.

Control processor 320 also controls the generation and power of pilot, synchronization, and paging channel signals and their coupling to transmit power controller 328. The pilot signal or channel is simply a signal that is not modulated by data, and may use a repetitive unchanging pattern or non-varying frame structure type input to transmit modulator 326. That is, the orthogonal function, Walsh code, used to form the channel for the pilot signal generally has a constant value, such as all 1's or 0's, or a well known repetitive pattern, such as a structured pattern of interspersed 1's and 0's. This effectively results in transmitting only the PN spreading codes applied from PN generator 332.

While control processor 320 can be coupled directly to the elements of a module, such as transmit module 334 or receive module 324, each module generally comprises a module-specific processor, such as transmit processor 330 or receive processor 321, which controls the elements of that module. Thus, in a preferred embodiment, control processor 320 is coupled to transmit processor 330 and receive processor 321, as shown in FIG. 3. In this manner, a single control processor 320 can control the operations of a large number of modules and resources more efficiently. Transmit processor 330 controls generation of, and signal power for, pilot, synchronization, paging signals, and traffic channel signals, and their respective coupling to power controller 328. Receive processor 321 controls searching, PN spreading codes for demodulation and monitoring received power.

For certain operations, such as shared resource power control, gateways 120 and 122 receive information such as received signal strength, frequency measurements, or other received signal parameters from user terminals in communication signals. This information can be derived from the demodulated outputs of data receivers 316 by receive processors 321. Alternatively, this information can be detected as occurring at predefined locations in the signals being monitored by control processor 320, or receive processors 321, and transferred to control processor 320. Control processor 320 uses this information (as described below) to control the timing and frequency of signals being transmitted and processed using transmit power controllers 328 and analog transmitter 338.

In order to implement embodiments of the present invention, one or more pre-correctors or frequency pre-correction elements 342 and 344 are used. Preferably, a precorrection element 342 is used to adjust the frequency of the digital output of digital power controller 328 at baseband frequency. As in the user terminal, baseband spectral information including the frequency adjustment is translated to the appropriate center frequency during the up-conversion performed in analog transmitter 338. The frequency pre-correction is accomplished using techniques known in the art, such as the complex signal rotation discussed above, where the angle of rotation is computed on the basis of known satellite ephemrides and desired channel frequency. As in the user terminal, other signal rotation techniques, and related hardware, are well understood in the art.

In FIG. 3, pre-corrector 342 is shown disposed in the transmission path prior to summer 336. This allows individual control over each user terminal signal as desired. However, a single frequency pre-correction element can be used when pre-correction is performed after summer 336, because user terminals share the same transmission path from the gateway to the satellite.

As an alternative, a pre-corrector 344 can be disposed in the transmission path on the output of analog transmitter 338, to adjust the frequency of the outgoing signal, using well known techniques. However, changing the frequency on the output of the analog transmitter can be more difficult, and may interfere with signal filtering processes. Alternatively, the output frequency of analog transmitter 338 can be adjusted directly by control processor 320 to provide a shifted output frequency, offset from the normal center frequency.

The amount of frequency correction imposed on the outgoing user terminal signal, forward link, is based on known Doppler between the gateway and each satellite through which communication is established. The amount of shifting required to account for the satellite Doppler can be computed by control processor 320 using known satellite orbital position data. This data can be stored in and retrieved from one or more storage elements 346, such as lookup tables or memory elements. This data can also be provided from other data sources, as desired. A variety of well known devices such as RAM and ROM circuits, or magnetic storage devices can be used to construct storage elements 346. This information is used to establish the Doppler adjustment for each satellite being used by the gateway at any given time.

As shown in FIG. 3, a time and frequency unit (TFU) 348 provides reference frequency signals for the analog receiver 314. A Universal Time (UT) signal from a GPS receiver can be used as part of this process in some applications. It can also be employed in multiple intermediate conversion steps, as desired. As shown, TFU 348 also serves as a reference for analog transmitter 338. TFU 348 also provides timing signals to other stages or processing elements within gateway or base station 300 such as the correlators in digital receivers 316A–N and 318, or transmit modulator 326, and control processor 320. TFU 348 is also configured to retard or advance the relative timing of (clock) signals, under processor control, by predetermined amounts, as desired.

During communication system 100 operation, a communication signal s(t) transmitted by a gateway (120, 122) to a user terminal (124, 126) using a gateway generated carrier frequency of $f_F$, experiences time delays, a frequency shift due to Doppler, and other effects. First, while transiting from a gateway to the satellites (116, 118), and second, when transiting from satellites to user terminals. Once the signal is received, there is a further delay in sending a return signal, and Doppler in the transit from the user terminal (124, 126) to the satellite (116, 118) and again from the satellite to the gateway.

If most variations due to atmospheric effects or satellite transponder and transmitter characteristics are treated as having a negligible impact, the frequency of a signal arriving at a receiver is essentially (apparently) shifted from the initial absolute or reference frequency $f_F$ by Doppler effects. Therefore, communication signals received by a satellite from a gateway on a forward link have a new or shifted carrier frequency $f_{SatF}$, according to the relationship:

$$f_{SatF} = f_F(1 - v_{gs}/c), \tag{1}$$

where $v_{gs}$ is the relative gateway-satellite velocity, or change in separation distance or range over time (referred to as range rate), and c is the speed of light, which is the approximate speed of the signal through the transfer medium (air).

When communication signals experiencing this Doppler shift are retransmitted by a satellite at the same frequency ($f_{SatF}$) and subsequently received by a user terminal, they are received at yet another new carrier frequency $f_{Urec}$, according to the relationship:

$$f_{Urec}=f_{SatF}(1-v_{su}/c)=f_F(1-v_{gs}/c)(1-v_{su}/c), \quad (2)$$

where $v_{su}$ is the relative satellite-user terminal velocity or range rate. The carrier frequency $f_{Urec}$ received by the user terminal is the transmitted carrier frequency $f_{SatF}$ shifted by Doppler, the magnitude of which is unknown at this point.

If the user terminal receiver is tuned to receive at this new frequency ($f_{Urec}$), and to return or transmit signals at the same frequency, then return link signals arriving at the gateway from the user terminal have a new carrier frequency $f_{Grec}$, according to the relationship:

$$f_{Grec}=f_{Urec}(1-v_{sg}/c)(1-v_{us}/c), \quad (3)$$

where $v_{us}$ is the relative user terminal-satellite velocity or range rate, which equals $v_{su}$, and $v_{sg}$ is the relative satellite-gateway velocity which is equal to $v_{gs}$.

The above relationships assume a single nominal frequency is being used. However, satellite communication systems are more typically configured to use different nominal frequencies or frequency bands for various portions of the forward and reverse communication links for well known reasons. For example, they may be used to minimize interference or enhance certain amplifier control and gain functions in the satellites. That is, different center or nominal frequencies are used for each of the gateway-to-satellite, satellite-to-user terminal, user terminal-to-satellite, and satellite-to-gateway links, respectively. For example, a gateway may transmit signals at $f_{F1}$ while a forward link satellite-to-user terminal signal transmission occurs at a nominal frequency of $f_{F2}$, reverse link signals transmitted by the user terminal may have a nominal frequency of $f_{R1}$, and the reverse link satellite signals a nominal frequency of $f_{R2}$. In this situation, the received signal frequencies for these links $f_{SatF}$, $f_{Urec}$, $f_{SatR}$, and $f_{Grec}$, respectively, after Doppler shifting become:

$$f_{SatF}=f_{F1}(1-v_{gs}/c) \quad (4)$$

$$f_{Urec}=f_{F2}(1-v_{su}/c) \quad (5)$$

$$f_{SatR}=f_{R1}(1-v_{us}/c) \quad (6)$$

$$f_{Grec}=f_{R2}(1-v_{sg}/c) \quad (7)$$

However, for purposes of clarity, the following discussion will be generally limited, except for some generalizations, to using two frequencies, one each for the entire gateway-to-user terminal forward and then reverse links, resulting in link signal relationships of:

$$f_{Urec}=\theta_F(1-v_{gs}/c)(1-v_{su}/c) \quad (8)$$

$$f_{Grec}=f_R(1-v_{us}/c)(1-v_{sg}/c) \quad (9)$$

where $f_F=f_{F1}=f_{F2}$ and $f_R=f_{R1}=f_{R2}$. Those skilled in the art will readily understand how the teachings of the present invention apply in various multiple frequency environments.

In a satellite based communication system, the position and relative motion of satellites within their orbits at any given time, is known to a great deal of certainty (known ephemerides). To the extent that the satellite positions vary at any given time, there are techniques known in the art to accurately determine such variations or new positions and trajectories. For example, signals can be transferred from a gateway to a satellite and back, to determine changes in velocity or distance which are compared to pre-stored data. Therefore, using known techniques such as, but not limited to, look up tables, memory elements, interpolation, and various computational techniques, the position and motion of each satellite used in a communication system relative to any gateway is known. This information can be stored or computed at each gateway or periodically provided from centralized control centers.

In any case, using the known satellite position and motion information, the Doppler factor for the gateway-to-satellite $(1-v_{gs}/c)$ and satellite-to-gateway $(1-v_{sg}/c)$ paths or portions of any communication link are determinable or known quantities. These Doppler values can be generated or determined by a gateway for virtually any satellite and gateway communication link combination.

Therefore, by labeling the satellite-to-gateway path Doppler term as $D_1$, and satellite-to-user terminal path Doppler term as $D_2$, the above relationships for $f_{Grec}$ and $f_{Urec}$ can be restated as:

$$f_{Urec}=f_F D_1 D_2 \quad (10)$$

$$f_{Grec}=f_F D_1^2 D_2^2 \quad (11)$$

for a single nominal frequency mode ($f=f_R=f_F$), and $$f_{Grec}=f_R D_2 D_1 \quad (12)$$

for a dual nominal frequency mode (separate reverse link frequency, $f_R \neq f_F$), with $D_2$ being the only quantity unknown to the gateway (or user terminal) when signals are transferred.

Since the satellite ephemeris or orbit positions are known to the gateway, the gateway can pre-correct for Doppler. That is, the gateway adjusts the frequency of signals for the gateway-to-satellite Doppler ($D_1$) of the particular satellite being used, before they are transmitted. This can be done, for example, using the precorrection elements discussed in relation to FIG. 3, above. In this situation, the received frequencies $f_{Grec}$ and $f_{Urec}$ become:

$$f_{Urec}=f_F D_2 \quad (13)$$

$$f_{Grec}=f_R D_2 D_1 \quad (14)$$

with the latter frequency being adjusted upon reception by the gateway to remove or compensate for the known Doppler ($D_1$). In the alternative, the forward link transmission could be precorrected for the return link known Doppler ($D_1$) as well during initial transmission in some systems.

However, as discussed above, the reference oscillator in the user terminal may not be accurately operating at the expected reception or transmission frequencies $f_F$ or $f_R$. Instead, due to inaccuracy or oscillator drift, the output of the oscillator is shifted by an error $\chi$, which is typically expressed as a fractional portion of the desired frequency in parts per million (ppm). This error factor gives rise to a frequency offset $f_{OffF}$ or $f_{OffR}$ from either $f_F$ or $f_R$, respectively. That is, the oscillator is not operating at an appropriate frequency to provide the expected or desired $f_F$ and $f_R$ frequencies, either directly or when scaled to those frequencies through a desired conversion process. The normalized forward and reverse link signal frequency offsets (frequency scaled) are related to the error $\chi$ according to:

$$\chi=f_{OffF}/f_F=f_{OffR}/f_R$$

for the two frequency mode, and $$\chi=f_{OffF1}/f_{F1}=f_{OffF2}/f_{F2}=f_{OffR1}/f_{R1}=f_{OffR2}/f_{R2}$$

for the four frequency mode.

Therefore, when a communication signal is received by the user terminal, the "measured" carrier frequency $f_{MUrec}$ is related to the transmitted frequency $f_F$ according to the relationship:

$$f_{MUrec}(1+f_{OffF}/f_F)=f_F D_1 D_2 f_{MUrec}=f_F D_1 D_2/(1+f_{OffF}/f_F) \quad (15)$$

or $$f_{MUrec}=f_F D_1 D_2/(1+\chi) \quad (16)$$

If the gateway pre-corrects signals for the gateway-to-satellite Doppler effect ($D_1$), for the particular satellite being used, then this becomes:

$$f_{MUrec}=f_F D_2/(1+\chi) \quad (17)$$

The user terminal then transmits the reverse link signal at a frequency of $f_R$, but using precorrection to account for the satellite-to-user terminal Doppler effect ($D_2$). However, this precorrection factor will include the oscillator error or frequency offset factor ($1+\chi$), and the frequency error $\chi$ or offset $f_{OffR}/f_R$ will also impact this generation of this signal directly, resulting in a signal $f_{SatR}$ arriving at the satellite with a frequency of:

$$f_{SatR} = f_R(1 + f_{OffR}/f_R)D_2/(D_2/(1 + f_{OffF}/f_F)) \quad (18)$$

$$f_{SatR} = f_R(1 + \chi)D_2/(D_2/(1+\chi)) \quad (19)$$
$$= f_R(1+\chi)^2$$

and, when the signal is received at the gateway:

$$f_{Grec}=f_R(1+\chi)^2 D_1 \quad (20)$$

there being no frequency error imparted by the gateway, or base station, oscillators by definition. This signal is again Doppler compensated by the gateway, by applying a negative Doppler shift, to remove the Doppler shift value $D_1$.

The above analysis of oscillator error would seem to imply another degree of uncertainty or another variable to solve for within the system. However, the inventors discovered that there is a less complex solution than understood in the art, for obtaining the frequency offset and, thus, for correcting for user terminal oscillator error. Therefore, according to the present invention, frequency information and Doppler associated with round trip communication signals are processed in a unique manner to obtain oscillator error which is then compensated for.

First, note that the above relationship for $f_{Grec}$ can also be expressed as:

$$f_{Grec}=f_F D_1(1+2\chi+(\chi)^2) \quad (21)$$

For communication signals or systems of interest, the third term, with the exponent, approaches zero. This is a result of the frequency error term being very small, generally on the order of a one to tens of parts per million ($10^{-6}$–$10^{-5}$), such that its square provides a substantially immeasurable contribution ($10^{-12}$–$10^{10}$). The carrier frequencies ($f_F$, $f_R$) are very large, generally on the order of several gigahertz ($10^9$). For example, using exemplary nominal carrier frequencies of 1.618 GHz and 2.492 GHz for transmission and reception, a typical error of 10 ppm ($10^{-5}$) produces frequency offsets of 16.18 kHz and 24.92 kHz, respectively, while the latter term above produces an impact on the order of 0.16 Hz and 0.24 Hz, respectively.

Therefore, for signals in typical communication systems, the above relationship for $f_{Grec}$ can be reduced to the form:

$$f_{Grec}=f_0 D_1(1+2\chi) \quad (22)$$

which is used in the present invention as the basis for determining frequency error.

In order to determine and separate out frequency error in the preferred embodiment of the invention, it is assumed at each user terminal that any frequency offset of the nominal carrier frequency for signals received from a gateway, is the result of Doppler $D_2$. That is, any offset of $f_{MUrec}$ from the expected frequency $f_F$, based on its oscillator (used as a reference for $f_F$), is treated as being $D_2$. Therefore, in transmitting signals back to the same gateway through the same satellite, the user terminal compensates for this perceived Doppler $D_2$, by adjusting its transmission frequency. This is done, for example, by using the pre-correction elements discussed above to apply a negative Doppler factor, having the same magnitude as the square of $D_2$.

When the signal arrives at the satellite, the $D_2^2$ factor that would otherwise have been present is absent or removed (compensated for), resulting in a received signal frequency $f_{SatR}$ for the reverse link at the satellite of:

$$f_{SatR}=f_R(1+2\chi) \quad (23)$$

and at the gateway of:

$$f_{Grec}=f_R D_1(1+2\chi) \quad (24)$$

As stated above, the gateway knows the value for $D_1$ and once the frequency of a received signal is determined, can compensate for known Doppler effects and remove the $D_1$ factor that is present. Again, using the precorrection elements discussed above to apply a negative Doppler factor, having the same magnitude as $D_1$. Therefore, the frequency of the round trip signal received at the gateway, after accounting for this Doppler compensation, becomes:

$$f_{Grec} = f_R(1 + 2\chi) \quad (25)$$

or $$f_{Grec} = f_R(1 + 2f_{OffR}/f_R) \quad (26)$$
$$= f_R + 2f_{OffR}$$

Since the gateway knows both this received carrier signal frequency, $f_{Grec}$ (measured), and the expected transmission frequency, $f_R$, (assigned in system) the oscillator error or the offset for this link created by the error in the user terminal can be computed according to the relationships:

$$(f_{Grec}-f_R)/2 \, f_R=\chi \quad (27)$$

and $$(f_R-f_{Grec})/2=f_{OffR} \quad (28)$$

with $f_{OffR}/f_R=\chi$.

The signal returned by the user terminal to the gateway simply incorporates twice the frequency offset created by the oscillator error, or twice the error. The error is factored in when the signal is received from the gateway at the user terminal, and it is tracked or its frequency is measured, and again when the return signal is generated for transmission to the gateway, or a base station. The measured difference between the received and expected frequencies is divided in half to provide the error offset (here $f_{OffR}$) and scaled to the user terminal oscillator frequency ($f_{OffR}/f_R$) to provide the error $\chi$.

At this point, a gateway or base station has made a determination of the oscillator error for each particular user terminal (124, 126) with which it is communicating, and for which oscillator error information is desired. The user terminal oscillator error or offset information can be transmitted back to each corresponding user terminal to allow that terminal to correct the oscillator frequency.

Figure 4:
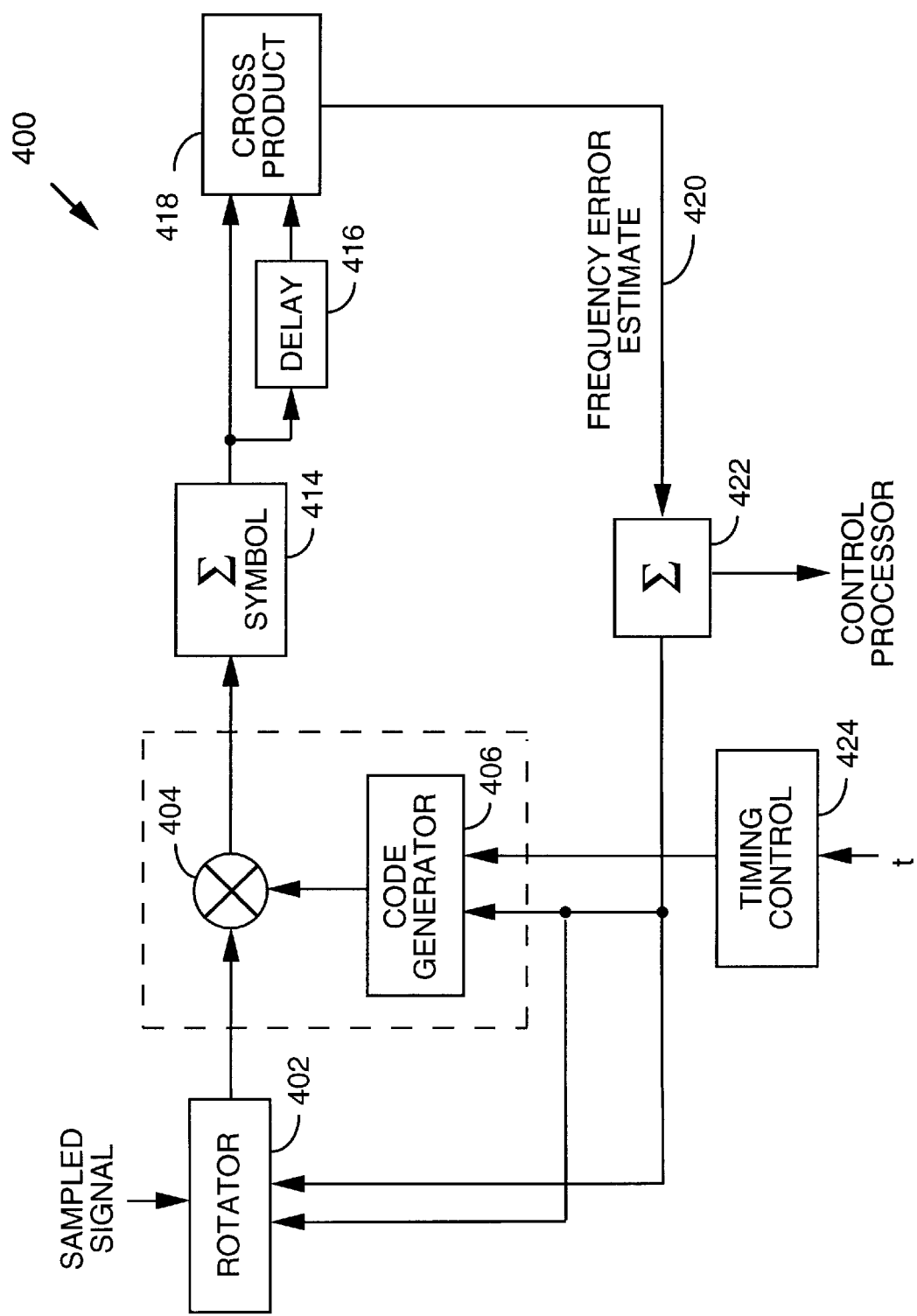
FIG. 4 illustrates exemplary frequency tracking apparatus for use in receivers in the communication system of FIG. 1.

One embodiment for performing frequency measurements is illustrated in FIG. 4, which presents an overview of a frequency tracking loop 400 for use in a user terminal, or gateway receiver. In FIG. 4, communication signals from the analog receiver are input to a rotator 402 which operates at a preselected frequency or phase rotation amount to transfer samples to subsequent stages. Rotated samples are transferred to one or more combination elements 404, typically multipliers, for combining with appropriate system PN spreading and orthogonal codes, where used, respectively. These codes are provided by at least one code generator or source 406. For frequency tracking, the orthogonal code is generally one used to generate a pilot or paging signal. Alternatively, PN spreading and orthogonal codes can be combined together and then combined with the samples in a single step. Where traffic channels are used to adjust the frequency, an FHT element may be used in place of combiner 404 and code generator 406. This technique is shown in U.S. patent applicant Ser. No. 08/625,481 entitled "Frequency Tracking For Orthogonal Walsh Modulation," which is assigned to assignee of the present invention and is incorporated herein by reference.

Despread and decoded signals are accumulated over a symbol period in accumulator 414, as known, to provide a data symbol, and the results provided to both a vector cross product generation element or generator 418 and a one symbol time delay element 416. Delay element 416 provides a one symbol period delay before transferring symbols to cross product generator 418. Cross product generator 418 forms a vector cross product between a given symbol and the preceding symbol (symbol period) to determine phase error between the symbols. For pilot signals, this provides a measure of error in the phase rotation of the input signal. The output from cross product generator 418 is provided as a frequency error estimate or adjustment factor to rotator 402 and code generator 404.

Timing control for the decimation, despreading, and decoding processes is provided by circuitry such as a timing control circuit 424, as before. This timing may be provided as an output from one or more time tracking loops or control elements, as discussed above.

The amount by which each finger or digital receiver adjusts its phase or frequency to align with an input signal is used to determine relative frequency offsets in arriving signals. That is, the amount by which the decimator has to be adjusted to align the signals indicates that amount by which the arriving signal frequency is offset from the expected or local reference frequency for the receiver.

Since the communication system operates within fixed sets of frequency bands for communication signals, the receivers know the center or nominal carrier frequencies to use or expect. However, as a result of Doppler the arriving signal will not be at the expected center frequency. The adjustments discussed above define an offset, which can be used to determine the Doppler, and the actual frequency of arriving signals.

This is easily accomplished by tracking the total amount of change implemented by frequency tracking loop 400. An accumulator 422 can be used to simply accumulate and sum each of the error estimates, signals, or commands over a preselected period. This provides a total or net amount of change needed to align the incoming signal and receiver frequencies, and represents the frequency offset of the signal from local user terminal or receiver frequency, scaled to the appropriate frequency band. The method or process undertaken by the present invention is illustrated in flow chart form in FIG. 5. During this process, relative frequency offsets or errors in one or more user terminals are determined. The detected errors are then used to compensate for frequency errors during signal demodulation.

Figure 5:
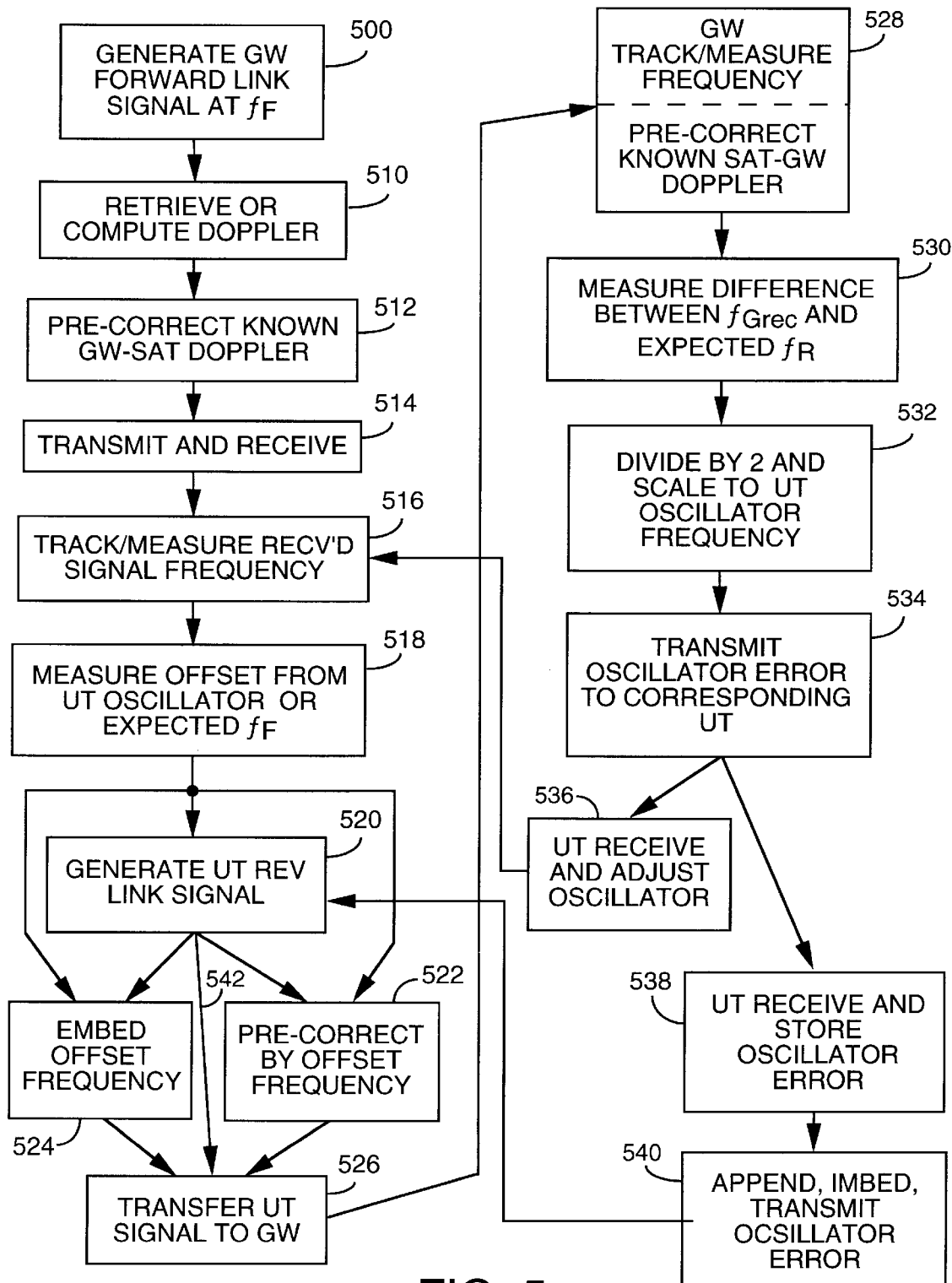
FIG. 5 illustrates steps used to implement a frequency error detection process according to the present invention.

As shown in FIG. 5, a communication signal is generated at a gateway at nominal frequency $f_F$ in a step 500. This signal is typically a shared resource signal such as a pilot signal that substantially all user terminals being serviced by a base station (subject to sectorization) or gateway receive for a CDMA channel. Alternatively, the signal can be other shared resource, or strong signals, such as paging or synchronization signals transmitted regularly by gateways.

Prior to transmission, the outgoing signal is pre-corrected for Doppler in a step 512. That is, the known Doppler effect occurring for signals traveling between the gateway and a given satellite through which the signal is being transferred is compensated for. This pre-correction can be accomplished using frequency pre-correction elements in the transmission train, as discussed above. Techniques to adjust the frequency of signals prior to transmission are well known in the art and not discussed in further detail here. The amount of shifting required to account for the satellite Doppler can be retrieved from a series of lookup tables or information storage devices, or computed using known satellite orbital position data, in a step 510. This information is used to establish the Doppler adjustment applied to outbound or forward link signals at any given time. Where a satellite is not used to transfer the forward link signal, any Doppler is typically an unknown quantity and is not compensated at this point.

A single frequency pre-correction element or circuit can be used at this point, if desired, because all user terminals of interest share the same transmission path from the gateway to the satellite. Path differences occur when the satellite transfers communication signals to the various user terminals having different positions within different sub-beams.

User terminal communication signals are transmitted and received, in a step 514, again typically as pilot or paging signals, although traffic signals can be used. Each user terminal uses searcher type receivers, or receivers searching for possible communication signals and pages, to acquire communication signals arriving from a gateway or base station. As part of the process, receivers search several frequency, and PN code, hypothesis or projected potential values, to detect communication signals. In a step 516, user terminals track the frequency of incoming communication signals, and measure their frequency or determine a difference or offset from the expected forward link frequency (set by communication system), based on the user terminal oscillator output in step 518.

The user terminal then prepares a communication signal for transmission to the gateway, through the same satellite, in a step 520. The user terminal employs the type of baseband, digital modulation, and analog circuitry described above in relation to FIG. 2. The return signal can be a request for a traffic channel to make a call, a response to a paging or broadcast signal, or other types of known signals. This signal is not simply prepared using the oscillator as a reference, but has the frequency adjusted in a step 522, after the basic signal is prepared, to compensate for Doppler effects between the satellite and the user terminal.

The frequency pre-correction applied by the user terminal in step 522, involves using a frequency pre-corrector as discussed above, and in a manner similar to that of the gateway. The amount of frequency correction imposed on the outgoing user terminal signal, reverse link, is determined from the results of step 518.

The signal transmitted by each user terminal is transferred by an appropriate satellite, in a step 526, to the gateway where the frequency or frequency offset relative to the expected reverse link signal frequency is measured in a step 528. Unless the satellite is operating in a configuration where it applies frequency precorrection to transferred signals, the signal arriving at the gateway has a Doppler shift imparted. Therefore, the gateway first compensates for this Doppler shift by subtracting the known (step 512) Doppler offset from the measured frequency. In the alternative, all signals received from a given satellite can have an automatic amount of Doppler correction applied before searching receivers even attempt to acquire such signals and determine their frequency offset.

In any case, with the known Doppler removed, the gateway measures the difference between the received frequency $f_{Grec}$ and the gateway reference for the expected reverse link frequency $f_R$ (set and known in system) in a step 530. The result is divided in half in step 532 to form the estimated oscillator offset error ($f_{Off}$). This offset is scaled to the frequency of the user terminal oscillator to form the final error value $\chi$. The oscillator error can then be transmitted to the corresponding user terminal (124, 126) as part of a forward link signal in a step 534.

The user terminal then adjusts the oscillator output frequency in a step 536, using any number of techniques well known in the art. This adjustment can take place at periodic intervals, either before each communication link is established or on a frequent basis during communications. The choice of correction interval or timing is based on a desired minimum system accuracy, and can also be based on a threshold value for the magnitude of the error or a predetermined passage of time since a previous correction. These are factors well known in the art and based in part on expected drift in frequency during use, and changes in particular user terminal oscillators, which may also be impacted by an operating environment.

In some communication systems the user terminal oscillator may not have a fine frequency adjustment or tuning capability. That is, the oscillator may be preset for operation at one fixed frequency without any adjustment capability during use, or configured to use a preselected set of frequencies with no fine tuning. These configurations may be used because of cost considerations in some communication systems where it is considered commercially important to provide a very low cost communications solution. In such systems, many user terminals will not be able to use the detected oscillator error to actually change the oscillator output.

However, even when a user terminal cannot adjust the oscillator frequency to compensate for errors, it can include the error determination information in subsequent signal transmissions, as information gateway receivers can employ in acquiring and tracking signals from that user terminal. The user terminal informs receiving gateways of the amount by which it would have adjusted the reference frequency if it had been able to do so. This information is used in the gateway, or a base station, in much the same manner known Doppler is used, to adjust the searcher frequencies for acquiring and tracking signals.

In addition, where fine tuning of the oscillator is not available, the oscillator may also not be able to compensate for Doppler in received signals as used in FIG. 5 step 522. In this situation, the user terminal can determine an offset value as in step 518, and provide this information to gateways. This can be done by embedding or appending the information to reverse link signals, as in step 524, or by generating a signal just for transferring such information as data (520). With this data and the actually measured reverse link signals from the user terminal, a gateway can determine the oscillator error as before.

However, since the user terminal is not adjusting the oscillator frequency, the user terminal receives and stores the oscillator error in a step 538, such as in memory element 236. This information is then appended, embedded, or otherwise transmitted in subsequent communication signals to a gateway, as in step 540. Here, there is no precorrection of the frequency, as shown by line 542.

The frequency adjustments described above can take place at periodic intervals or as desired for the accuracy of the particular communication system. Where the user terminal stores the error value in a memory or other known storage device, the error values are retrieved on some predetermined basis to inform receiving gateways of the approximate amount of oscillator error at a given time. The error value can be sent as part of access request messages, or can form part of traffic signals. The error can be transmitted as the only data in a particular signal to a gateway as desired.

The error value determined according to the above steps, can also be used to adjust user terminal timing or time, instead of or in addition to frequency. For example, the local time that is calculated by or stored in a user terminal can be adjusted to account for errors caused by oscillator frequency errors. The user terminal control processor can change the time value stored in memory, either on a periodic basis, or at start up. In this manner, time as maintained by the user terminal for certain signal processing tasks, and/or as stored and then updated by the user terminal, can be maintained more accurately. This is especially important for changes in user terminal status, as when changing from inactive to active operating modes, or experiencing what are termed as "cold" or "warm" starts, in which time information is used to acquire signals.

In addition, the timing of PN codes can be adjusted by advancing or retarding the application of such codes by a predetermined number of chips to account for timing errors imparted by oscillator errors. Such adjustments can be implemented using the control inputs for the clock/timing element described above. Other circuitry known in the art can also be used to receive or intercept and adjust timing of signals used within the user terminal.

The frequency measurements for communication signals can take place either during communication link setup or during actual communication periods. If the measurement takes place during call setup or establishment, the signal being measured by user terminals 124, 126 is generally transmitted from gateways 122, 124 as part of a paging signal. The "re-transmission" process for this signal is generally accomplished as part of an access signal or access channel probe. If the frequency measurement takes place during a call, the signal being measured is transmitted from gateways 122, 124 and then back as part of forward and reverse link traffic signals. As would be apparent to one skilled in the relevant art, the measured signals can have other functions or labels, or be incorporated into or form parts of other signals, without departing from the spirit and scope of the present invention.

While the above approach allows an improved technique for detecting and correcting or compensating for oscillator errors in user terminals, further improvements can be made to system operation if the satellite-user terminal Doppler shifting is also determined. This can be accomplished by returning to the expressions above and precorrecting for frequency error instead of Doppler effects.

In this alternative embodiment of the invention, each user terminal assumes that any offset of the received carrier frequency from the locally generated carrier center frequency, for signals received from a gateway, is the result of oscillator error $\chi$ or offset $f_{Off}$. In transmitting signals back to the gateway, or base station, the user terminal compensates for the perceived oscillator error, by again adjusting transmission frequency. When the signal arrives at the satellite, the oscillator error has been pre-corrected (compensated for), resulting in a received frequency $f_{SatR}$ for the-reverse link at the satellite of:

$$f_{SatRT}=f_R(1+\chi)D_2/((1+\chi)/D_2)=f_R D_2^2 \qquad (29)$$

and, when the signal is received at the gateway:

$$f_{Grec}=f_R D_2^2 D_1 \qquad (30)$$

which, after correction for known Doppler ($D_1$) and insertion of the definition for the Doppler factor $D_2$, becomes:

$$f_{Grec}=f_R[1-2(v_{us}/c)+(v_{us}/c)^2] \qquad (31)$$

Again, the last term approaches zero, or produces a substantially reduced impact, for communication signals or systems of interest, providing:

$$f_{Grec}=f_R[1-2(v_{us}/c)] \qquad (32)$$

and $$(f_{Grec}-f_R)/2f_R=-(v_{us}/c) \qquad (33)$$

which can be used as the basis for estimating or determining Doppler between the satellite and the user terminal.

Figure 6:
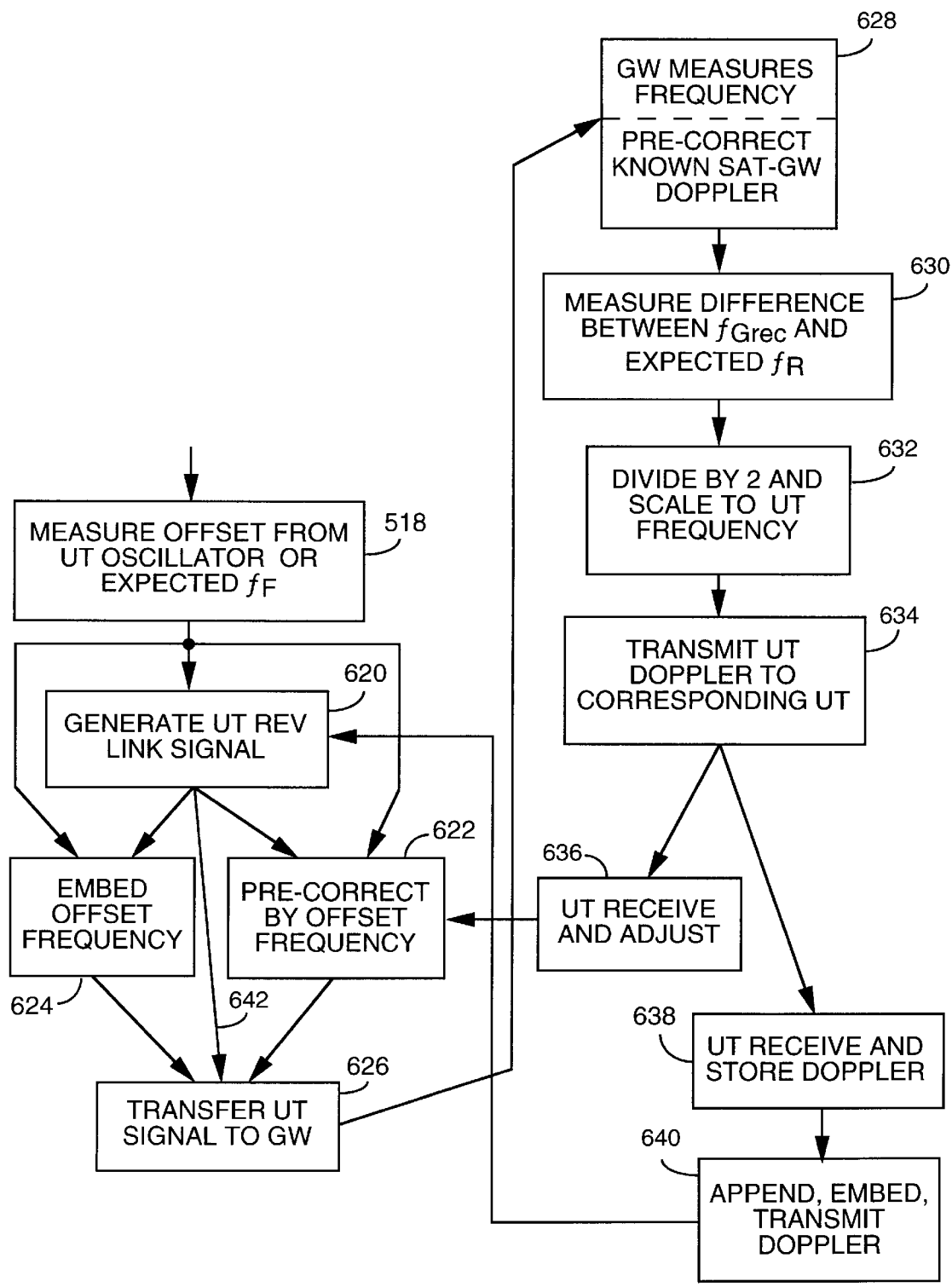
FIG. 6 illustrates steps used to implement a Doppler shift detection process according to the present invention.

The method or process undertaken by the present invention to compensate for Doppler shifts between the satellite and a user terminal is illustrated, in part, in flow chart form in FIG. 6. Here a communication signal has already been transmitted by a gateway at frequency fF, generally after being pre-corrected for Doppler effects, and acquired by the user terminal (as in steps 500, 510, 512, 514, and 516). The user terminal then measures the difference or offset from the expected forward link frequency based on the oscillator frequency in step 518, and prepares a communication signal for transmission to the gateway, through the same satellite, in a step 620.

The frequency can be pre-corrected or adjusted, as before, in a step 622, after the basic signal is prepared, to compensate for user terminal oscillator errors. The frequency pre-correction applied in step 622, involves using a frequency pre-corrector as discussed above, and the amount of frequency correction imposed is determined from the results of step 518. The difference in this embodiment is that the pre-correction is applied to remove perceived oscillator error and not Doppler shifting.

The signal transmitted by each user terminal is transferred by an appropriate satellite, in a step 626, to a gateway where the frequency is again measured in a step 628. Unless the satellite applies frequency pre-correction, the gateway compensates for Doppler shifting by subtracting the known (step 512) Doppler created offset from the measured frequency offset. Of course, for systems using base stations, no pre-correction for satellite Doppler is needed. In the alternative, all signals received from a given satellite can have an automatic amount of Doppler correction applied before receivers attempt to acquire or track the signals and determine the frequency.

In any case, with the known Doppler removed, the gateway measures the difference between the received frequency $f_{Grec}$ and the gateway expected reverse link frequency fR in a step 530. The result is divided in half in step 532 and scaled to the link frequency to form the estimated unknown Doppler shift. The estimated Doppler can then be transmitted to the corresponding user terminal (124, 126) as part of a forward link signal in a step 536.

The user terminal then adjusts the oscillator output frequency in a step 540, using any number of techniques well known in the art. This adjustment can take place at periodic intervals, either before each communication link is established or on a frequent basis during communications. As before, the choice of correction frequency is based on factors well known or understood in the art, which may also be impacted by operating environment.

Also, as before with regards to oscillator errors, where fine tuning of the oscillator is not available, or not desired, the Doppler determination information can be included in subsequent signal transmissions, as information gateway receivers can employ in acquiring and tracking signals from that user terminal. The user terminal informs gateways of the amount by which the return link signal would have been adjusted if it had been possible, or desirable, to do so. This information is used in the gateway, in much the same manner known Doppler is used, to adjust receiver frequencies for acquiring and tracking signals. In addition, this information can be employed in a user terminal to adjust timing and clock signals as opposed to frequency pre-correction. For example, the timing of the application of PN codes can be adjusted to provide compensation for code Doppler.

In this situation, the user terminal receives and stores the Doppler estimate in a step 538, such as in memory element 236. This information is then appended, embedded, or otherwise transmitted in subsequent communication signals to a gateway, as in step 540. Here, there is no precorrection of the frequency, as shown by line 542.

In addition, where fine tuning of the oscillator is not available, the user terminal may also not be able to compensate for oscillator errors detected for the received signals as used in FIG. 5 step 522. In this situation, the user terminal can determine an offset value as in step 416, and provide this information to gateways, as in step 524. With this data and the actually measured reverse link signals from the user terminal, a gateway can determine the Doppler as before.

As above, adjustments or transmission of information relating to Doppler effects can take place at periodic intervals or as desired for the accuracy of the particular communication system. In addition, this information can be employed in a user terminal to adjust timing and clock signals as opposed to frequency.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What we claim as the invention is:

1. A method for determining frequency offsets from a desired communication signal center frequency in at least one of a plurality of user terminals in a communication system having at least one fixed signal transceiver for transferring communication signals to and from user terminals, comprising the steps of:

transmitting a forward link communication signal from the at least one fixed signal transceiver using a first predetermined carrier frequency and a first Doppler effect pre-correction value for communication link Doppler when known;

receiving said forward link communication signal at said user terminal, and determining a first offset for a corresponding received carrier frequency relative to the first predetermined carrier frequency;

generating a reverse link signal at a second predetermined carrier frequency at said user terminal also incorporating any user terminal reference frequency source error, scaled to the second predetermined carrier frequency;

applying a frequency pre-correction to said reverse link signal based on said determined first offset;

transmitting said reverse link communication signal to said fixed signal transceiver;

receiving said reverse link signal at said fixed signal transceiver, and determining a second offset for an associated carrier frequency relative to said second predetermined carrier frequency associated with said user terminal communication, after again applying said first Doppler effect pre-correction value for communication link Doppler when known; and dividing the resulting second offset in half to produce a user terminal communication link frequency offset that is to be compensated for during communications.

2. The method of claim 1 further comprising the steps of:

applying a frequency pre-correction at said user terminal as correction for a second Doppler value for user terminal-to-fixed signal transceiver Doppler, based on said determined second offset; and scaling said resulting second offset which is divided in half to produce a user terminal reference source frequency error value.

3. The method of claim 2 wherein said reference source comprises a local oscillator, and said reference source frequency error value comprises an oscillator error value.

4. The method of claim 3 further comprising the step of transferring the oscillator error value to said user terminal as part of a subsequent communication signal.

5. The method of claim 4 further comprising the steps of receiving the oscillator error value at said user terminal as part of said subsequent communication signal, and adjusting said oscillator output frequency by said error value, to cause the oscillator output frequency to approach the fixed signal transceiver reference frequency.

6. The method of claim 4 further comprising the steps of receiving the oscillator error value at said user terminal as part of said subsequent communication signal, and inserting it in subsequent communication signals to the fixed signal transceiver.

7. The method of claim 6 wherein said oscillator error value is inserted as data in an access request signal.

8. The method of claim 1 further comprising the steps of:

applying a frequency pre-correction at said user terminal as correction for reference source frequency error in said user terminal, based on said determined second offset; and dividing said resulting second offset in half to produce a user terminal-to-fixed signal transceiver Doppler value.

9. The method of claim 8 further comprising the step of transferring the user terminal-to-transceiver Doppler value to said user terminal as part of a subsequent communication signal.

10. The method of claim 9 further comprising the steps of receiving the user terminal-to-transceiver Doppler value at said user terminal as part of said subsequent communication signal, and inserting said user terminal-to-transceiver Doppler value in subsequent communication signals to the fixed signal transceiver as known Doppler.

11. The method of claim 10 wherein said user terminal-to-transceiver Doppler value is inserted as data in an access request signal.

12. The method of claim 1 wherein said fixed signal transceiver comprises a base station.

13. The method of claim 1 wherein said fixed signal transceiver comprises a gateway and a satellite is used for transferring said forward and reverse link signals with said gateway.

14. The method of claim 1 wherein said satellite communication system comprises a wireless spread spectrum CDMA communication system.

15. The method of claim 1 wherein said user terminal comprises a wireless telephone.

16. Apparatus for determining frequency offsets from a desired communication signal center frequency in at least one of a plurality of user terminals in a communication system having at least one fixed signal transceiver for transferring communication signals to and from user terminals, comprising:

means for transmitting a forward link communication signal from the at least one fixed signal transceiver using a first predetermined carrier reference frequency and a first Doppler effect pre-correction value for communication link Doppler, when known;

means for receiving said forward link communication signal at said user terminal, and determining a first offset for associated carrier frequency relative to the first predetermined carrier reference frequency;

means for generating a reverse link signal at a second predetermined carrier reference frequency at said user terminal also incorporating any user terminal reference frequency source error, scaled to the second predetermined carrier reference frequency;

means for applying a frequency pre-correction to said reverse link signal based on said determined first offset;

means for transmitting said reverse link signal to said fixed signal transceiver;

means for receiving said reverse link signal at said fixed signal transceiver, and determining a second offset for associated carrier frequency relative to said second predetermined carrier reference frequency associated with said user terminal communication, after again applying said first Doppler effect pre-correction value for communication link Doppler when known; and means for dividing the resulting second offset in half to produce a user terminal communication link frequency offset that is to be compensated for during communications.

17. The apparatus of claim 16 further comprising:

means for applying a frequency pre-correction at said user terminal as correction for a second Doppler value for user terminal-to-fixed signal transceiver Doppler, based on said determined second offset; and means for scaling said resulting second offset which is divided in half to produce a user terminal reference source frequency error value.

18. The apparatus of claim 17 wherein said reference source comprises a local oscillator, and said reference source frequency error value comprises an oscillator error value.

19. The apparatus of claim 18 further comprising means for transferring the oscillator error value to said user terminal as part of a subsequent communication signal.

20. The apparatus of claim 19 further comprising means for receiving the oscillator error value at said user terminal as part of said subsequent communication signal, and for adjusting said oscillator output frequency by said error value, to cause the oscillator output frequency to approach the fixed signal transceiver reference frequency.

21. The apparatus of claim 19 further comprising means for receiving the oscillator error value at said user terminal as part of said subsequent communication signal, and for inserting it value in subsequent communication signals to the fixed signal transceiver.

22. The apparatus of claim 21 wherein said oscillator error value is inserted as data in an access request signal.

23. The apparatus of claim 16 further comprising:
means for applying a frequency pre-correction at said user terminal as correction for reference source frequency error in said user terminal, based on said determined second offset; and
means for dividing said resulting second offset in half to produce a user terminal-to-fixed signal transceiver Doppler value.

24. The apparatus of claim 23 further comprising means for transferring the user terminal-to-transceiver Doppler value to said user terminal as part of a subsequent communication signal.

25. The apparatus of claim 24 further comprising means for receiving the user terminal-to-transceiver Doppler value at said user terminal as part of said subsequent communication signal, and inserting said user terminal-to-transceiver Doppler value in subsequent communication signals to the fixed signal transceiver as known Doppler.

26. The apparatus of claim 25 wherein said user terminal-to-transceiver Doppler value is inserted as data in an access request signal.

27. The apparatus of claim 16 wherein said fixed signal transceiver comprises a base station.

28. The apparatus of claim 16 wherein said fixed signal transceiver comprises a gateway and a satellite is used for transferring said forward and reverse link signals with said gateway.

29. The apparatus of claim 16 wherein said satellite communication system comprises a wireless spread spectrum CDMA communication system.

30. The apparatus of claim 16 wherein said user terminal comprises a wireless telephone.

31. Apparatus for determining oscillator error in at least one of a plurality of user terminals used in a satellite communication system having at least one gateway and at least one satellite for transferring communication signals between gateways and user terminals, comprising:
means for transmitting a forward link communication signal from at least one gateway through said satellite using a first predetermined carrier reference frequency and a first Doppler pre-correction value for gateway-to-satellite communication link Doppler;
means for receiving said forward link communication signal at said user terminal, and determining a first offset for associated carrier frequency relative to the first predetermined carrier reference frequency;
means for generating a reverse link signal at a second predetermined carrier reference frequency at said user terminal also incorporating any oscillator error, scaled to the second predetermined carrier reference frequency;
means for applying a frequency pre-correction to said reverse link signal for a second Doppler value for user terminal-to-satellite Doppler, based on said determined first offset;
means for transmitting said reverse link signal to said at least one gateway through said satellite;
means for receiving said reverse link signal at said gateway, and determining a second offset for associated carrier frequency relative to said second predetermined carrier reference frequency associated with said user terminal communication, after compensating for said first Doppler pre-correction value; and
means of dividing the resulting second offset in half and scaling to the user terminal oscillator frequency to produce a user terminal oscillator error value.

32. A method for determining oscillator error in at least one of a plurality of user terminals used in a satellite communication system having at least one gateway and at least one satellite for transferring communication signals between gateways and user terminals, comprising the steps of:
transmitting a forward link communication signal from at least one gateway using a first predetermined carrier reference frequency and a first Doppler pre-correction value for gateway-to-satellite communication link Doppler;
receiving said forward link communication signal at said user terminal, and determining an offset for associated carrier frequency relative to the first predetermined carrier reference frequency;
generating a reverse link signal at a second predetermined carrier reference frequency at said user terminal also incorporating any oscillator error, scaled to the second predetermined carrier reference frequency;
applying a frequency pre-correction to said reverse link signal for a second Doppler value for user terminal-to-satellite Doppler, based on said determined first offset;
transferring said reverse link signal through said satellite to said gateway;
receiving said reversed link signal at said gateway, and determining a second offset for associated carrier frequency relative to said second predetermined carrier reference frequency associated with said user terminal communication, after compensating for said first Doppler pre-correction value; and
dividing the resulting second offset in half and scaling to the user terminal oscillator frequency to produce a user terminal oscillator error value.

* * * * *